United States Patent [19]
Valette

[11] Patent Number: 4,911,513
[45] Date of Patent: Mar. 27, 1990

[54] INTEGRATED OPTICAL DEVICE ALLOWING FOR THE SEPARATION OF POLARIZED COMPONENTS OF A GUIDED ELECTROMAGNETIC FIELD AND THE METHOD OF MAKING THE DEVICE

[75] Inventor: Serge Valette, Grenoble, France

[73] Assignee: Commissariat a l'Energie Atomique, Paris, France

[21] Appl. No.: 297,310

[22] Filed: Jan. 17, 1989

[30] Foreign Application Priority Data
Jan. 14, 1988 [FR] France ................................ 88 00357

[51] Int. Cl.$^4$ .................................................. G02B 6/10
[52] U.S. Cl. .................................. 350/96.12; 350/96.14
[58] Field of Search ............... 350/96.11, 96.12, 96.13, 350/96.14, 96.34

[56] References Cited
U.S. PATENT DOCUMENTS

| | | | |
|---|---|---|---|
| 4,669,815 | 6/1987 | Thaniyavarn | 350/96.15 |
| 4,711,515 | 12/1987 | Alferness | 350/96.14 |
| 4,772,084 | 9/1988 | Bogert | 350/96.15 |

FOREIGN PATENT DOCUMENTS
2558271 7/1985 France .

OTHER PUBLICATIONS
Patent Abstracts of Japan (vol. 8, No. 151, 163, 219).
Patent Abstracts of Japan (vol. 9, No. 76).
Patent Abstracts of Japan (vol. 10, No. 140).
IEE Proceedings, vol. 133, Pt. J., No. 4, Aug. (1986).

Primary Examiner—Frank Gonzalez
Attorney, Agent, or Firm—Nutter, McClennen & Fish

[57] ABSTRACT

The invention concerns an integrated optical device allowing for separation of the polarized components of a guided electromagnetic field which, in order to obtain separation, comprises a coupler comprising a first and a second electromagnetic wave guide structure, the core of each structure being spaced by a predetermined interval so as to enable the energy of one of the structures to be coupled to the other structure, these structures admitting guided modes and having different effective indices for a first polarized component of the electromagnetic field and equal for a second polarized component of said field, the interval between these cores being constant over a predetermined distance (L) at the end of which the energy is totally transferred for the second polarized component, this interval increasing at the end of this distance (L) so as to be able to recover on each of these structures one of the polarized components of the field.

6 Claims, 5 Drawing Sheets

INTEGRATED OPTICAL DEVICE ALLOWING FOR THE SEPARATION OF POLARIZED COMPONENTS OF A GUIDED ELECTROMAGNETIC FIELD AND THE METHOD OF MAKING THE DEVICE

FIELD OF THE INVENTION

The invention concerns an integrated optical device allowing for the separation of the polarized components of a guided electromagnetic field, as well as a method to embody the device.

BACKGROUND OF THE INVENTION

It is customary to use integrated optical devices in the case where, for example, it is desired to have a luminous beam carried by an optical fiber passed to another optical fiber. The simplest case of such a transfer consists of carrying out an end-to-end connection of two optical fibers. It is also possible to transfer all or part of the energy transported by inserting an integrated optical device between two optical fibers.

The simplest device shown on FIG. 1 consists of a guidance structure which comprises a thin guidance layer 10, known as a core, inserted between two layers 20, 30, all of which is laid onto a substrate 40. The core refraction index or coefficient is always greater than the refraction coefficients of the adjacent layers 20, 30.

The luminous beam spreads into this guidance layer 10 with one dying out part in each of the adjacent layers. FIG. 1 shows a cross section along the direction of propagation.

In such a structure, an electromagnetic field may spread according to two types of propagation modes: a first type of mode, known as a transversal or quasi-transversal mode (noted TE), the electrical field associated with the electromagnetic wave for this type of mode being in the plane of the guidance layer, and a second type of mode, known as a magnetic transversal or quasi-transversal mode (noted TM) where the magnetic field is within the plane of the layer. Generally, the integrated optical devices are embodied so as to only allow for propagation of a single mode of each type; these modes are known as fundamental modes. In the remainder of the description and for the sake of more simplicity, the text shall consider the case of structures only allowing for propagation of these fundamental modes. Any wave inclined with respect to these two modes is of necessity split into two components, one being of type TE, the other being of type TM.

One known integrated optical device makes it possible to carry out transfers by coupling. FIG. 2 shows a cross sectional view of such a circuit perpendicular in the propagation direction and FIG. 3 shows a top view of said circuit. The structure of the integrated optical electromagnetic wave coupler shown in these figures comprises two generally identical layers 3, 4 between which two out-of-joint layers 1,2 are placed with an index higher than those of the layers 3 and 4 and identical for the two layers, these layers occuring on a given plane, as can be seen from the section shown on FIG. 2. The layers 1 and 2 associated with the adjacent layers 3 and 4 form parallel optical guides. The entire unit is laid down on a substrate 5. The choice of the interval e between the two layers, each forming the actual cores 1, 2, enables action to be taken on the coupling coefficients KE and KM between the two guides. These coefficients are also a function of the parameters characterising the guides. KE and KM respectively represent the coupling coefficient of the modes TE and TM (guided modes).

When an electromagnetic wave is injected into the core guide 1, all the energy of this wave is able to pass into the core guide 2 at the end of propagation distances, namely functions of the coupling coefficients KE, KM, provided the propagation speeds of the guided modes of the same type are identical in each of the guides taken independently. In the case where the propagation speeds are not equal, the energy transfer shall be partial, but shall reach a maximum at the end of distances which are functions of the coupling coefficients KZ and KM, but also of the difference between these speeds.

Conventionally, guided structures are used having a small index difference $\Delta n$ between the core and the two layers between which it is inserted, as the guidance structure is consequently scarcely dependent on the type of wave polarization. This is a distinct advantage and in fact it is possible to guide a luminous wave with such a structure without being too much concerned with its polarization, the TE and TM modes then having almost the same field profiles and effective indices (note that the effective index is the ratio between the speed of the light and the speed of the guided mode). Moreover, this type of structure allows for high coupling efficiency between a monomode optical fiber and the fiber-optical light guides.

Now, it has been proved necessary in certain applications to use guidance structures with slight index differences (slight $\Delta n$) so that at least one of the guides is slightly sensitive to polarization and possesses sound connection efficiency with a monomode fiber and, at the same time, is able to separate the polarized components from the guided electromagnetic field. This is the case when, for example, it is sought to embody a polarization diversity receiver and also when it is sought to embody optical sensors using luminous polarization.

None of the existing integrated optical devices are slightly sensitive to the polarization of a luminous wave, as well as allowing for separation of the two polarized components TE and TM.

The present invention makes it possible to resolve this problem. It concerns a coupler type integrated optical device which, by virtue of its special structure and optical characteristics, makes it possible to obtain the two desired functions.

SUMMARY OF THE INVENTION

Thus, the object of the invention is to provide an integrated optical device comprising a first and second electromagnetic wave guidance structure, each structure comprising a core, these cores being spaced by a predetermined interval so as to enable the energy of one the structures to be coupled to the other of these structures admitting guided modes which have different effective indices for a first polarized component of the electromagnetic field and equal for a second polarized component of this field, the interval between these two cores being constant over a predetermined distance L similar to a distance at the end of which a total transfer of the energy relating to the second polarized component takes place from one guided structure towards the other structure, the interval separating the two structures increasing beyond this distance so that a separation of the polarized components of the field is obtained.

The device is advantageously embodied by means of a first guidance structure in which the core is constituted by a strip of index material n1+n1 included between first and second material layers of indices respectively n3 and n4, and by means of a second guidance structure in which the core is constituted by a strip of an index material n2 included between the second and a third material layer of indices respectively n4 and n5, the index n1 being larger than the indices n3 and n4 and the index n2 being larger than the indices n4 and n5.

Advantageously, the strips include within two parallel planes a rectilinear section spaced by a constant interval and a curved section embodied in the extension of the corresponding rectilinear section and spaced by an increasing interval so as to be reduced until the coupling is cancelled between the two structures. After the coupling has been cancelled, the interval between the two strips can once again become constant.

The separation of the modes by two guidance structures is effected by increasing the coupling interval beyond the coupling distance of one of the modes, the dimensions of the strips remaining constant, and/or by eventually modifying the dimensions of the strips.

The device is embodied advantageously from two guidance structures having superimposed layers, the strips constituting the cores being in two different layers close to each other over the entire coupling length and spaced beyond this coupling length.

It is possible to embody the index guidance strip n1 by using slightly doped silicon oxide, the second and third layers of the two structures being embodied by using silicon oxide, and the index guidance strip n2 by using highly doped silicon oxide.

It is also possible to embody the index strip n1 by using slightly doped silicon oxide, the index strip n2 being made up of either silicon nitride, aluminium or silicon oxynitride, the second and third layers of the two structures being made up of silicon oxide.

The object of the invention is to also provide a method for embodying an integrated optical device and consisting of the following stages:

depositing on a substrate an index layer n5 with a thickness of h8, depositing an index layer n2, thickness h2, etching this layer so as to obtain a strip of a predetermined length forming the core having a first section roughly rectilinear and parallel to the first rectilinear section of the other guidance strip over the predetermined length L and a second section, the second sections of the index strips n2 and n1 being separated from each other with at least one of these sections being curved, depositing an index layer n3 over the entire surface and with a thickness of h6.

With the index layers n5, n4 and n3 being preferably made possibly of silicon oxide, these layers are deposited by using, for example, a PECVD technique corresponding to a plasma-assisted vapor phase chemical decomposition deposit.

BRIEF DESCRIPTION OF THE DRAWINGS

In any event, the characteristics of the invention shall appear more readily from a reading of the following description relating to examples of embodiment, said examples being in no way restrictive. Annexed to this description are the following drawings.

Figure 1:
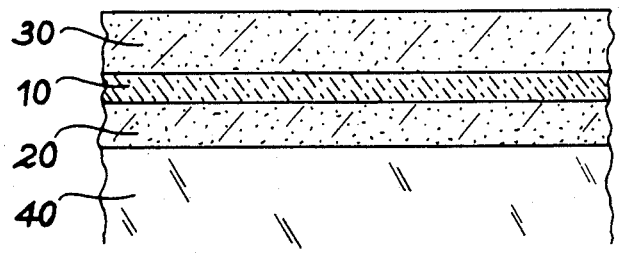
FIG. 1, already described, shows a cutaway view of a guidance structure according to a plane parallel to the propagation direction of the waves according to the prior Art.
Figure 2:
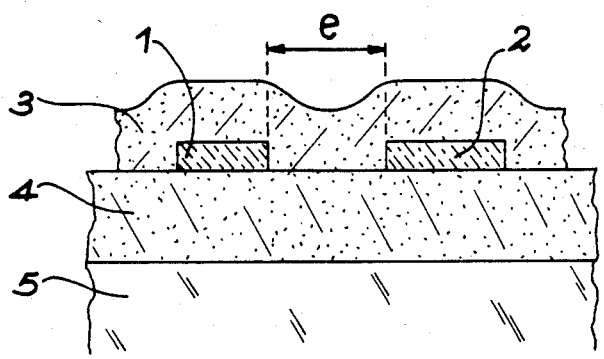
FIG. 2, already described, shows a cutaway view of the coupler according to a plane perpendicular to the propagation direction of the waves according to the prior Art.
Figure 3:
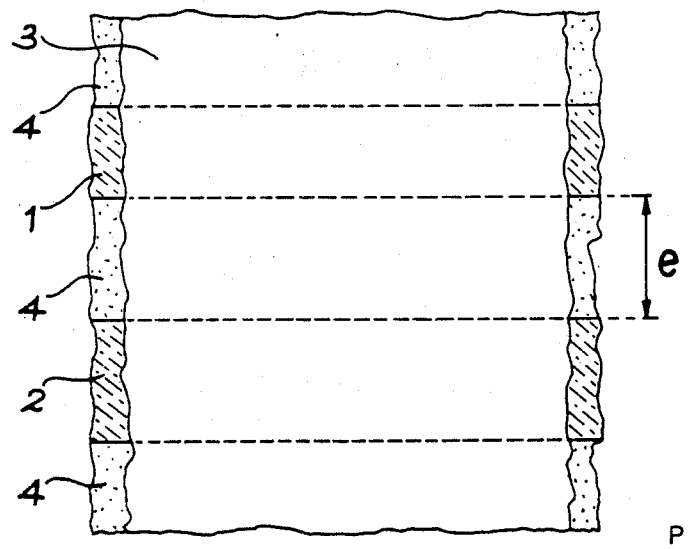
FIG. 3, already described, shows a cutaway view of a coupler according to the top view of FIG. 2 according to the prior Art.

A conventional guidance structure and a coupler have been respectively represented on FIGS. 1, 2 and 3 and have already been described in the introductory part of this text.

DETAILED DESCRIPTION OF THE PREFERRED EMBODIMENTS

Figure 4:
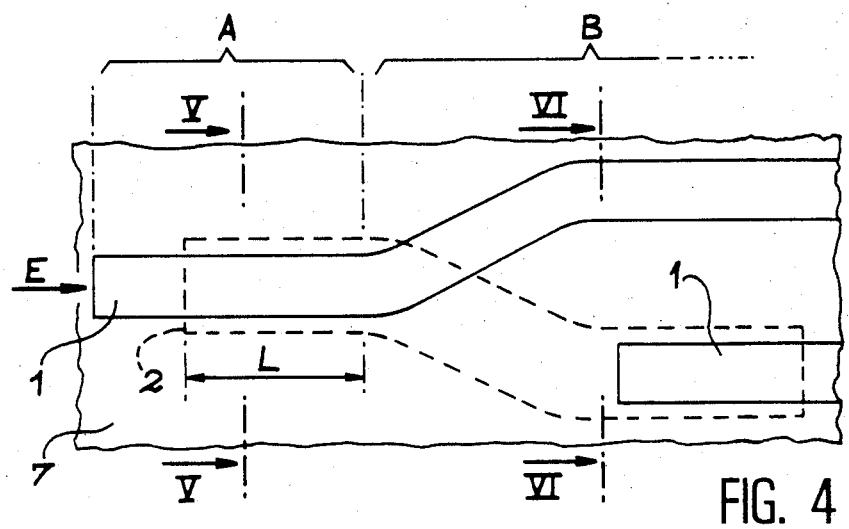
FIG. 4 shows a top view of an integrated optical device according to the invention.

FIG. 4 thus shows an example of an embodiment of the device according to the invention. This view shows a top view of the device. The device includes two guidance strips 1 and 2, which are found according to this particular example, superimposed and then spaced apart, but not within the same plane. The strips comprise a section A in which they are roughly rectilinear, and a section B in which they are spaced apart and curved. A smaller refraction index layer 7 is placed between the two strips constituting the cores of the two guided structures according to this particular embodiment. Other details concerning the embodiment shall be revealed upon reading the description.

The luminous wave is, for example, received by the guidance strip 1, which is the reason why it is possible to provide that this strip has an elongation with respect to the strip 2 so as to receive this wave without the latter being also received by the guidance strip 2. The guidance strips, such as the strip 1 or strip 2, are traditionally called cores in the guidance structure. These cores assume a curved shape at the end of a common predetermined length L which is slightly smaller than the coupling length Lc, namely the length at the end of which the energy of one of modes and transported by the core 1 has been transferred into the core 2. The cores 1 and 2 are then sufficiently spread and spaced apart so that there no longer is any interaction between them. For reasons of geometry, it may be useful to recuperate the energy on each of the cores 1 and 2 by means of a core having the same dimensions as the start core. By way of example, this is why this figure shows a core section 1 superimposed on the core 2 which enables all the energy derived from this core to be recuperated by coupling. This core section 1 is superimposed on the extremity of the core 2 over a length equal to the coupling length.

Figure 5:
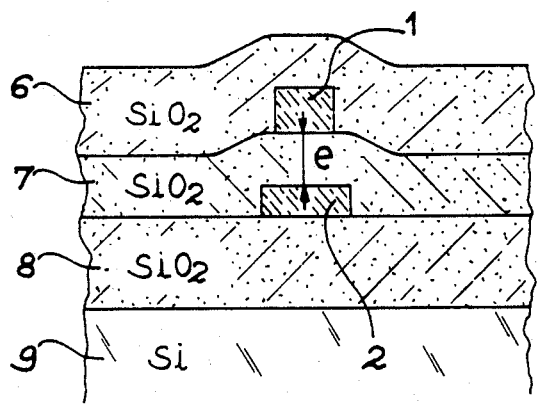
FIG. 5 shows the device according to the invention and viewed according to a cross section V—V in the rectilinear part.
Figure 6:
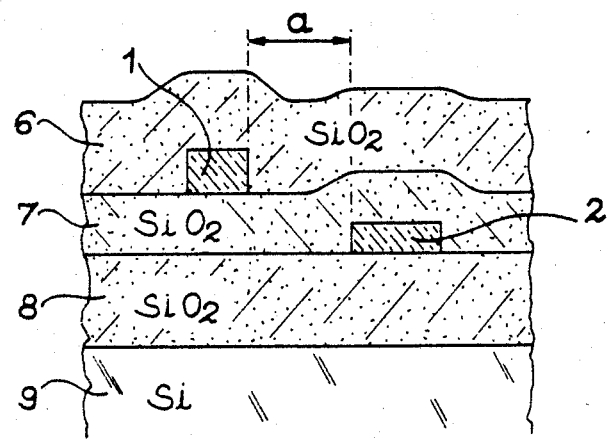
FIG. 6 shows the device according to the invention and viewed according to a cross section VI—VI in the curved part.

As can be seen from FIGS. 5 and 6, which respectively correspond to a section V—V and a section VI—VI both taken according to a plane perpendicular to the propagation direction of the waves, the device according to the invention comprises two guidance structures. A first structure comprises the core 1 with a refraction index n1 inserted between two layers 6 and 7 with a refraction index n3, n4. The second guidance structure comprises the core 2 with a refraction index n2 inserted between two layers 7 and 8 with an index n4, n5, the layer 7 being common to the two structures. These two structures are deposited on a substrate 9. Advantageously, the substrate 9 is silicon and the layers 6, 7 and 8 are silicon oxide so that n3=n4=n5=n. Of course, the substrate could also be glass or silicon or any other material on which it is possible to carry out the deposits and the layers 6, 7 and 8 may be constituted by different materials, the latter, however, needing to respectively have a refraction index smaller than that of the core they surround. For one of the two structures, materials are selected so that the refraction index difference between the core and the layers between which the index is inserted is relatively small, and for the other structure, materials are selected so that the refraction index between the core and the layers between which the index is inserted is large. For example, with the silicon oxide layers 6, 7 and 8, a silicon core ($n1-n=5.10^{-3}$) and an aluminium ($n2-n=1,5.10^{-1}$) or silicon nitride ($n2-n=5,5.10^{-1}$) or silicon oxinitride ($n2-n$) core 2 is selected able to vary between several $10^{-1}$ and several $10^{-2}$.

The effective index for a luminous beam spreading into a guided structure depends on the actual index of the traversed layers, the dimensions of the latter and the nature of the propagation mode.

As the modes TE and TM do not have the same spatial distribution, it is assumed that they do not have the same effective dimensions.

One of the structures having a small index variation will thus make it possible to have effective indices for the virtually identical modes TE and TM and the other structure having a high index variation will make it possible to have different effective indices for the two modes. Thus, these two guidance structures have different effective indices for one of the polarized components of the electromagnetic field and equal for the other component, the interval e between their cores being such that it allows for a coupling of the energies between the core guide 1 and the core guide 2. Only the modes for which the effective indices are identical shall pass from one core to the other, and more specifically from one guidance structure to the other, the energy transported by the guide mode, whose effective index differs from that of the corresponding mode in the other guide, not being transferred. Thus, at the end of the length Lc, namely at the end of the distance for which all the energy of one of the two modes has been transferred, it merely suffices that the cores of the guidance structures be adequately separated so that there no longer is any interaction between them and any possible coupling. In practice and so as to take account of the progressive decrease of coupling after the two guidance structures have been separated, a distance L smaller than the coupling length Lc shall be taken as the rectilinear distance common to the two structures; the value of L is calculated so that all the energy of the transferable mode is effectively transferred and depends in particular on the way separation between the two structures is carried out. Thus, for example, a guidance structure is selected comprising the core 1 for which the effective index of the mode TE, $n1_{eff}TE$ is very close to the effective index of the mode TM, n1, TM eff, itself being equal to the effective index of the mode TM, $n2_{eff}TM$ of the structure comprising the core 2. The guidance structure comprising the core 2 is such that the effective index TE, $n2_{eff}TE$ is on the contrary quite different from the effective index of the mode TM, $n2_{eff}TM$. Thus, the energy derived from propagation of the mode TM in the core guide 1 could be totally transferred into the core guide 2, whereas the energy derived from propagation of the mode TE shall remain in the core guide 1. Thus, the components of the modes TE and TM are separated.

The section represented on FIG. 6 shows the separation between the two cores 1 and 2, the two cores no longer being superimposed but spaced apart from each other according to this mode of embodiment and transversally with a value a which gradually increases when spaced from the point of separation between these guides and which then becomes constant.

Figure 7:
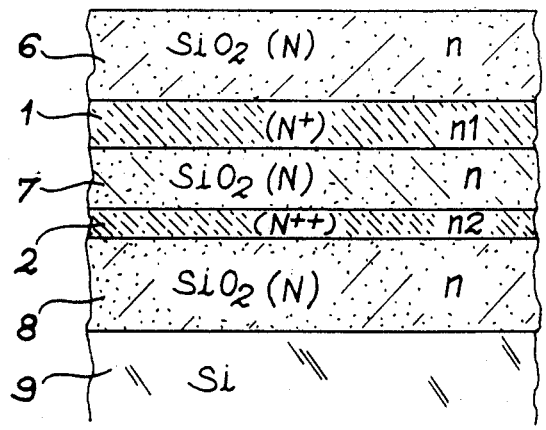
FIG. 7 shows the device according to the invention viewed according to a longitudinal section corresponding to the direction of propagation of the waves and relating to a first mode of embodiment.

FIG. 7 shows a longitudinal section of the device according to the invention and made in the part A (FIG. 4). This section is thus effected in the wave direction of propagation. It makes it possible to illustrate a first embodiment of the invention. Accordingly, the different layers of the structure can be seen. Initially, it shows a silicon support 9, a silicon oxide layer 8 with a refraction index n, and the core 2 with a refraction index n2 which is embodied according to this first embodiment variant by means of a highly doped (N++) layer of silicon oxide ($SiO_2$). It also shows the silicon oxide layer 7 with index n and above the core 1 with index n1 embodied according to this first embodiment variant by means of a slightly doped (N+) layer of silicon oxide and above the silicon oxide layer 6 with a refraction index n.

Figure 8:
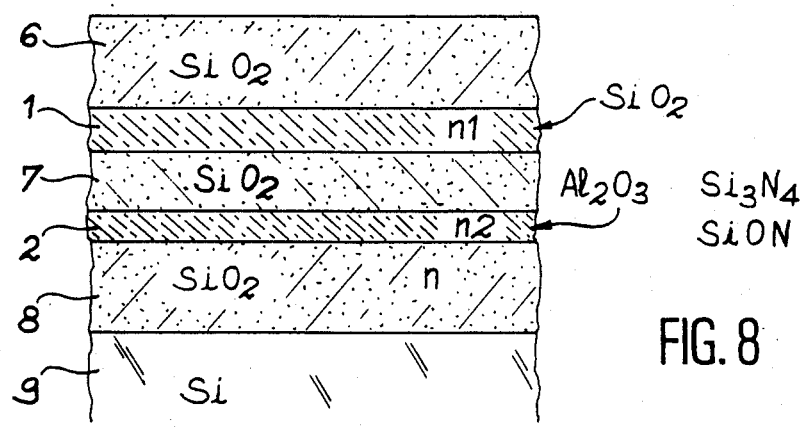
FIG. 8 shows a longitudinal section of the device according to the invention relating to second, third and fourth embodiment variants.

FIG. 8 also shows a cutaway view of the structure according a plane parallel to the wave propagation direction and shown in the part A. This section also reveals the superimposed structure of the layers according to the second, third and fourth embodiment variants. This figure differs from FIG. 7 as regards the embodiment of the layer 2, namely of the core 2 which may be embodied either from silicon nitride ($Si_3N_4$) or aluminium $Al_2O_3$, or from silicon oxynitride (SiON). It is possible to use other materials with a suitable refraction index and optical quality able to be obtained by depositing. Like those featured on FIG. 7, the layers 6, 7 and 8 can be embodied from silicon oxide and the substrate can be embodied from silicon. Thus, by taking a slightly doped silicon oxide core, it is possible to obtain a relatively small refraction index variation, namely a small n1−n, and by taking it either from highly doped silicon or from aluminium or silicon nitride or silicon oxinitride, it is possible to obtain a high index variation, namely a high n2−n.

If a variation n1−n of about several 10 is selected, which corresponds to the index variations encountered in the fibers, a height h1 of about 5 μm, the index n1 being equal to 1.46 and if it is sought to obtain equality between the effective index $n1_{eff}TE$, TM and $n2_{eff}TM$ and a difference between the effective indices $n2_{eff}TE$ and $n1_{eff}TE$, a relatively high $n2-n$ of about 0.55 is selected, but it is also possible to select a slightly lower $n2-n$ of about 0.15, which corresponds to an actual refraction index $n2=1.61$ (aluminium). In this case and in order to embody the desired conditions, a core 2 height h2 shall be selected between 300 and 500 Å and it could also be possible to obtain equality between the index $n1_{eff}TM$ and $n2_{eff}TM$ and a difference between the index $n1_{eff}TE$ and $n2_{eff}TE$ by choosing an $n2-n$ of about 0.07, which corresponds to an index $n2=1.52$ by taking a height h2 of the core 2 between 2000 to 5000 Å and by choosing for the core 2 highly doped silicon oxide (for example with phosphorus or titanium or germanium).

Figure 9:
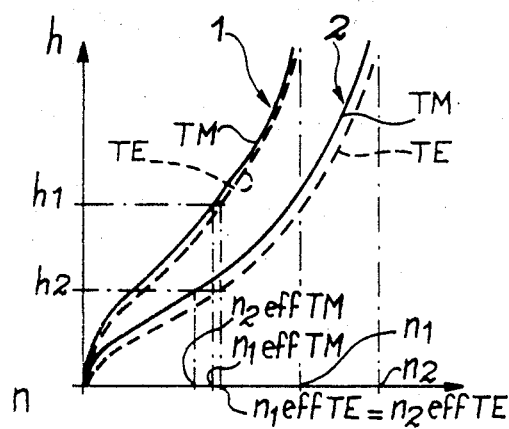
FIG. 9 shows the characteristic curves of the core guides 1 and 2 translating the variations of the effective indices for each of the modes according to the variations of the thickness of these modes.
Figure 10:
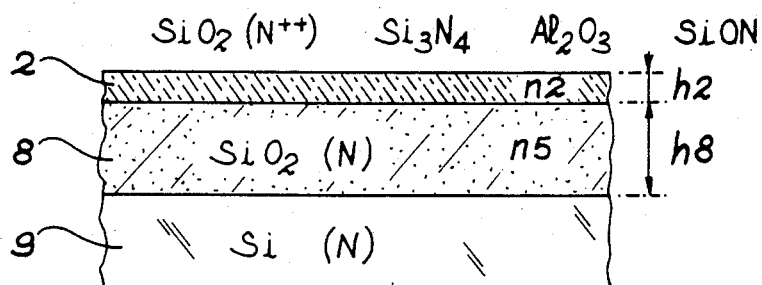
FIGS. 10 to 14 each show a step in the method for embodying the device according to the invention.

Sufficient precision may be obtained as regards equality between the effective indices of one of the two modes (TE or TM) by controlling the thickness and actual refraction index of the structures. FIG. 9 shows the variation of the effective indices for each of the modes TE and TM firstly for the core 1, and secondly for the core 2 according to the thickness of these cores. $n_s$ represents the refraction index of the substrate and n1 and n2 respectively represent the actual refraction indices of the cores 1 and 2. For a given material and for a given frequency band, the curve of the effective index is conventionally plotted for the mode TE and mode TM for each of the two cores. Then on the curves corresponding to the evolution of the effective index of the modes TE and TM, two points are selected for which the effective index for the modes TE or TM is the same for the two cores. From these two points, a marking is made of the corresponding value of the thicknesses of each strip constituting the cores 1 and 2. Thus, the core 1 shall have a thickness h2 and an effective index $n1_{eff}TE$ which is very similar to the effective index $n1_{eff}TM$ and which is equal to the effective index $n2_{eff}TE$, the effective index $n2_{eff}TM$ differing from the effective index $n1_{eff}TM$ and the effective index $n2_{eff}TE$ of the core 2 which shall thus have a thickness h2.

FIGS. 10 to 14 each represent a step of an example of a method embodying the device according to the invention.

Thus, one starts with a silicon substrate 9 on which a deposit of a layer 8 of silicon oxide is placed, the thickness h8 of the layer 8 being in the order of 8 to 10 μm. Then the layer 2 of highly doped silicon oxide is deposited with a thickness h2 roughly equal to 0.2 μm.

Doping is made at the time of depositing and the deposit is effected by a conventional technique known as PECVD which corresponds to a plasma-assisted vapor phase chemical decomposition depositing. Doping is effected conventionally and corresponds to a doping of about 18% phosphorus by weight. Of course, the deposit of the layer 2 can be effected by any other equivalent method and the doping used may be germanium, titanium or other suitable dopers.

Figure 11:
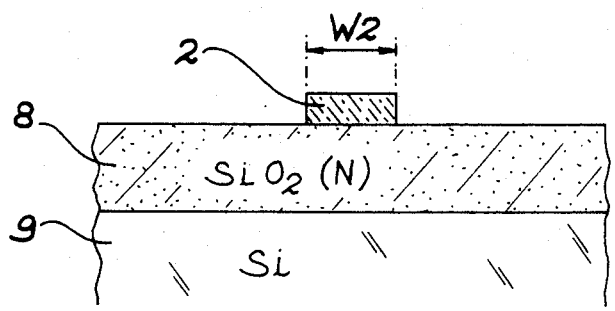

FIG. 11 shows the means for carrying out a partial etching of the highly doped silicon oxide layer 2 so as to obtain a strip 2, such as the one featured in FIG. 4. The width W2 of the strip 2 is generally in the order of 3 to 6 μm according to the value of the refraction index n2.

Figure 12:
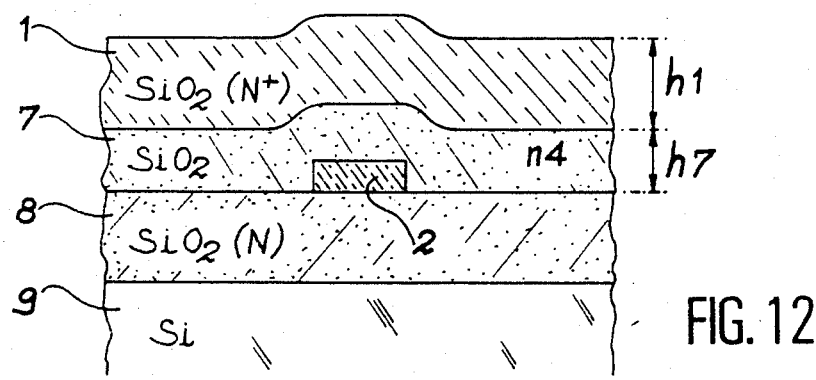

FIG. 12 shows the step of depositing the silicon oxide layer 7 covering the silicon oxide layer 8 and the core 2, this layer having a height h7 of about 1 to 3 m. FIG. 12 also shows the step of depositing the slightly doped silicon oxide layer 1 covering the silicon oxide layer 7. The deposit has also been effected by the conventional PECVD technique and the layer has a height h1 roughly equal to 5 μm (this height being comparable to the diameter of conventional monomode fibers, for example). Doping is carried out at the time of the depositing and corresponds, for example, to a doping of 0 to 1% phosphorus (As mentioned earlier, doping can be obtained using other types of dopers).

Figure 13:
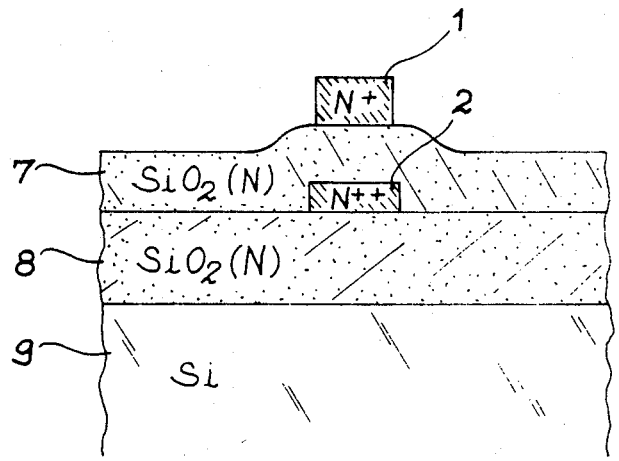

FIG. 13 shows the step which corresponds to the etching of the layer 1 making it possible to obtain the core 1 having the shape of a strip, such as the one shown on FIG. 4. The width W1 of this strip shall generally be about 4 to 6 μm to match the core diameters of the optical fibers.

Figure 14:
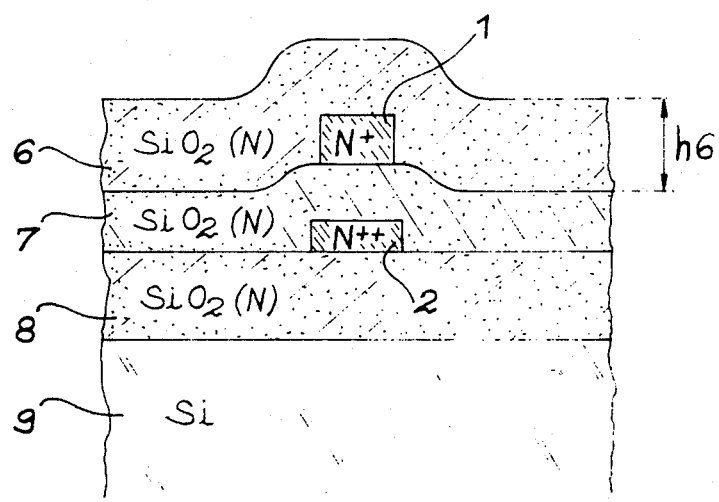

FIG. 14 shows the final step of the method consisting of a depositing of the silicon oxide layer 6 which covers the entire uncovered surface of the layer 7 and the surface of the core 1, the height h6 of this layer being roughly equal to 10 μm. Under these conditions, the variation of the index $n2-n$ is equal to $7.10^{-2}$ and the variation of the index $n1-n$ is equal to $5.10^{-3}$. These values have been defined for a wave length of the wave extending into the device equal to 1.3 μm, a coupling coefficient for the mode TM $K=3.10^{-3}$, a length Lc of 500 μm and bending radii of about several mm.

Of course, the values which are given correspond to a particular application. The values of all these parameters shall not be the same if, for example, silicon nitride or aluminium or silicon oxynitride is used to embody the core 2.

The particular embodiment example given, and whose embodiment method has already been described, corresponds to a structure having superimposed layers in which the cores 1 and 2 are housed, these cores being slightly superimposed in the part A where most of the coupling is effected. A structure in which the two cores 1 and 2 would be placed close to each other in the two superimposed layers, namely not directly opposite each other but which would allow for a coupling in the part A, clearly remains within the context of the present invention.

Moreover, the strips of the part B of the two guidance structures are respectively curved as shown in FIG. 4, but of course it merely suffices that only one of these strips be curved and sufficiently spaced from the other strip, which may remain rectilinear, so as to avoid any coupling.

What is claimed is:

1. An integrated optical device, wherein it comprises a coupler including a first and a second electromagnetic wave guidance structure, each structure comprising a core spaced by a predetermined interval so as to allow for a coupling of the energy of one of the structures towards the other and wherein said guidance structures admit guided modes which have different effective indices for a first polarized component of an electromagnetic field and equal for a second polarized component of said field, the interval between said cores being constant over a distance, also predetermined, and substantially equal to a distance at the end of which distance a total transfer has taken place of the energy relating to the second polarized component from one of said guidance structures towards the other, the interval separating said guidance structures increasing beyond said distance so that a separation of the polarized components of said field is thus obtained, said core of said first guidance structure consisting of a strip of real index material n1 between a first and second layer of respective index material n3, n4, said core of said second guidance structure consisting of a strip of a real index material n2 between the second and third index material layers n4, n5 respectively.

2. The device according to claim 1, wherein said strips each comprise a rectilinear part spaced by a constant interval and situated inside two parallel planes and a curved part, each curved part being in the prolongation of the corresponding rectilinear part and being spaced from the other curved part by an increasing interval so that there is no longer any coupling between said structures.

3. The device according to claim 1 or 2, wherein said first and second guidance structures are embodied by means of superimposed layers, said strips constituting said cores being in their rectilinear parts close to each other and housed in separate ones of said layers.

4. The device according to claim 1, wherein said strip of index material n1 forming one of said cores consists of slightly doped silicon oxide and wherein said strip of index material n2 forming the other of said cores consists of highly doped silicon oxide, said first, second and third layers of said guidance structures being constituted by silicon oxide.

5. The device according to claim 1, wherein said strip of index material n1 consists of doped silicon oxide and wherein said strip of index material n2 consists of silicon nitride or aluminum or silicon oxynitride, said first and second layers of said first guidance structure being constituted by silicon oxide.

6. A method of making an integrated optical device comprising the steps of:
  depositing on a substrate an index layer n5, thickness h8,
  depositing an index layer n2, thickness h2, on the preceding layer,
  etching said index layer n2 so as to obtain a first guidance strip of predetermined width forming a first core of index n2, said first guidance strip having a substantially rectilinear part and a second part,
  depositing a layer of index n4 above the index layers n5 and n2,
  depositing a layer of index n1, thickness h1 on the preceding layer,
  etching said index layer n1 so as to obtain a second guidance strip forming a second core having a substantially rectilinear part situated close to the rectilinear part of said first guidance strip over a predetermined guidance length and a second part, the second parts of said guidance strips being spaced from each other, at least one of said second parts being curved, and
  depositing a layer of index n3 over said index layers n4 and n1.

* * * * *